US012207366B2

(12) United States Patent
Hong et al.

(10) Patent No.: US 12,207,366 B2
(45) Date of Patent: Jan. 21, 2025

(54) LIGHTING DEVICE CONTROL DEVICE HAVING COLOR TEMPERATURE ADJUSTING FUNCTION

(71) Applicant: Xiamen PVTECH Co., Ltd., Fujian (CN)

(72) Inventors: Haibo Hong, Fujian (CN); Fuxing Lu, Fujian (CN); Longyin Chen, Fujian (CN)

(73) Assignee: Xiamen PVTECH Co., Ltd., Fujian (CN)

( * ) Notice: Subject to any disclaimer, the term of this patent is extended or adjusted under 35 U.S.C. 154(b) by 127 days.

(21) Appl. No.: 18/113,050

(22) Filed: Feb. 23, 2023

(65) Prior Publication Data

US 2024/0147586 A1 May 2, 2024

(30) Foreign Application Priority Data

Nov. 1, 2022 (CN) ......................... 202211355075.2

(51) Int. Cl.
*H05B 45/00* (2022.01)
*H05B 45/20* (2020.01)

(52) U.S. Cl.
CPC .................................... *H05B 45/20* (2020.01)

(58) Field of Classification Search
CPC ...... H05B 45/00; H05B 45/20; H05B 45/345; H05B 45/3725; H05B 45/375; H05B 45/50; H05B 45/59; H05B 47/10; H05B 47/18; H05B 47/24
See application file for complete search history.

(56) References Cited

U.S. PATENT DOCUMENTS

| | | | | |
|---|---|---|---|---|
| 10,314,124 B1 * | 6/2019 | Yang | ...................... | H05B 47/24 |
| 11,019,694 B2 * | 5/2021 | Mai | ...................... | H05B 45/31 |
| 11,153,946 B2 * | 10/2021 | Zhou | ...................... | H05B 45/10 |
| 2017/0006684 A1 * | 1/2017 | Tu | ...................... | H05B 45/20 |
| 2018/0027626 A1 * | 1/2018 | Wang | ...................... | H05B 45/24 315/186 |
| 2020/0389955 A1 * | 12/2020 | Price | ...................... | H05B 45/44 |

* cited by examiner

*Primary Examiner* — Thai Pham
(74) *Attorney, Agent, or Firm* — Winston Hsu

(57) ABSTRACT

A lighting device control circuit includes an input voltage generating circuit and color temperature adjusting circuit. The color temperature adjusting circuit includes an encoder switch and first voltage adjusting element. The encoder switch includes a first main pin, first auxiliary pin, second main pin, second auxiliary pin, main common pin, auxiliary common pin and switch element. The main common pin and the auxiliary common pin are connected to a grounding point. The switch element selectively connects two of the above pins to each other. The positive electrode of a first light source is connected to the grounding point and the negative electrode thereof is connected to the first main pin, first auxiliary pin and second auxiliary pin. The positive electrode of a second light source is connected to the grounding point and the negative electrode thereof is connected to the second main pin via the first voltage adjusting element.

10 Claims, 6 Drawing Sheets

LIGHTING DEVICE CONTROL DEVICE HAVING COLOR TEMPERATURE ADJUSTING FUNCTION

BACKGROUND OF THE INVENTION

1. Field of the Invention

The present invention relates to a lighting device control circuit, in particular to a lighting device control circuit having color temperature adjusting function.

2. Description of the Prior Art

Due to the advancement of technology, the functions of lighting devices have been greatly improved. Currently available lighting devices can already provide various adjusting functions. However, a currently available lighting device needs to generate a pulse-width modulation signal (PWM) through a microcontroller unit. Then, the lighting device can generate two current signals by an external metal-oxide-semiconductor field-effect transistor (MOSFET) in order to realize the color temperature adjusting function. The above color temperature adjusting function needs to be realized by a complicated circuit. Thus, the operation mechanism thereof is complicated and the cost thereof is also high.

SUMMARY OF THE INVENTION

The present invention is related to a lighting device control circuit having color temperature adjusting function. In one embodiment of the present invention, the lighting device control circuit includes an input voltage generating circuit and a color temperature adjusting circuit. The input voltage generating circuit generates an input voltage. The color temperature adjusting circuit includes an encoder switch and a first voltage adjusting element. The encoder switch includes a first main pin, a first auxiliary pin, a second main pin, a second auxiliary pin, a main common pin, an auxiliary common pin and a switch element. The main common pin and the auxiliary common pin are connected to a grounding point, and the switch element selectively connects the first main pin to the first auxiliary pin or connects the second main pin to the second auxiliary pin. The positive electrode of a first light source is connected to the grounding point and the negative electrode of the first light source is connected to the first main pin, the first auxiliary pin and the second auxiliary pin. The positive electrode of a second light source is connected to the grounding point and the negative electrode of the second light source is connected to the second main pin via the first voltage adjusting element.

In one embodiment, the first voltage adjusting element includes two first resistors connected to each other in parallel.

In one embodiment, the color temperature adjusting circuit further includes a second voltage adjusting element. The encoder switch further includes a third main pin and a third auxiliary pin. The negative electrode of the first light source is connected to the third auxiliary pin. The negative electrode of the second light source is connected to the third main pin via the second voltage adjusting element. The switch element selectively connects the third main pin to the third auxiliary pin.

In one embodiment, the second voltage adjusting element includes two second resistors connected to each other in parallel.

In one embodiment, the color temperature adjusting circuit further includes a third voltage adjusting element. The encoder switch further includes a fourth main pin and a fourth auxiliary pin. The negative electrode of the first light source is connected to the fourth main pin via the third voltage adjusting element. The negative electrode of the second light source is connected to the fourth auxiliary pin. The switch element selectively connects the fourth min pin to the fourth auxiliary pin.

In one embodiment, the third voltage adjusting element includes two third resistors connected to each other in parallel.

In one embodiment, the encoder switch further includes a fifth main pin and a fifth auxiliary pin. The negative electrode of the second light source is connected to the fifth main pin and the fifth auxiliary pin. The switch element selectively connects the fifth min pin to the fifth auxiliary pin.

In one embodiment, the color temperature of the first light source is different from that of the second light source.

In one embodiment, the color temperature of the first light source is lower than that of the second light source.

In one embodiment, the first light source and the second light source are light-emitting diodes (LEDs).

The lighting device control circuit having color temperature adjusting function in accordance with the embodiments of the present invention may have the following advantages:

(1) In one embodiment of the present invention, the lighting device control circuit can integrate the functions of an encoder switch with voltage-ampere characteristics of light sources (LEDs), so the lighting device control circuit can adjust the input voltage via a specially-designed color temperature adjusting mechanism in order to accurately control the color temperature of the light sources. Accordingly, the lighting device control circuit can effectively simplify the color temperature adjusting mechanism of a lighting device with a view to satisfy actual requirements.

(2) In one embodiment of the present invention, the lighting device control circuit can integrate the functions of the encoder switch with voltage-ampere characteristics of the light sources (LEDs) in order to simplify the color temperature adjusting mechanism of the lighting device. Thus, the cost for realizing the color temperature adjusting function of the lighting device can be reduced, so the lighting device can be more competitive in the market.

(3) In one embodiment of the present invention, the lighting device control circuit is provided with a plurality of voltage adjusting elements, so the lighting device can provide two or more color temperature. As a result, the lighting device can be more convenient and flexible in use.

(4) In one embodiment of the present invention, the lighting device control circuit can be further provided with anti-flicker module, so the lighting device can have the anti-flicker function and power adjusting function. Therefore, the performance of the lighting device can be further enhanced so as to conform to actual requirements.

(5) In one embodiment of the present invention, the lighting device control circuit can be further provided with an overvoltage protection function, which can significantly increase the safety of the lighting device. Thus, the lighting device can be more comprehensive in use in order to satisfy the requirements of different applications.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The present invention will become more fully understood from the detailed description given herein below and the accompanying drawings which are given by way of illustration only, and thus are not limitative of the present invention and wherein.

DETAILED DESCRIPTION

Figure 1:
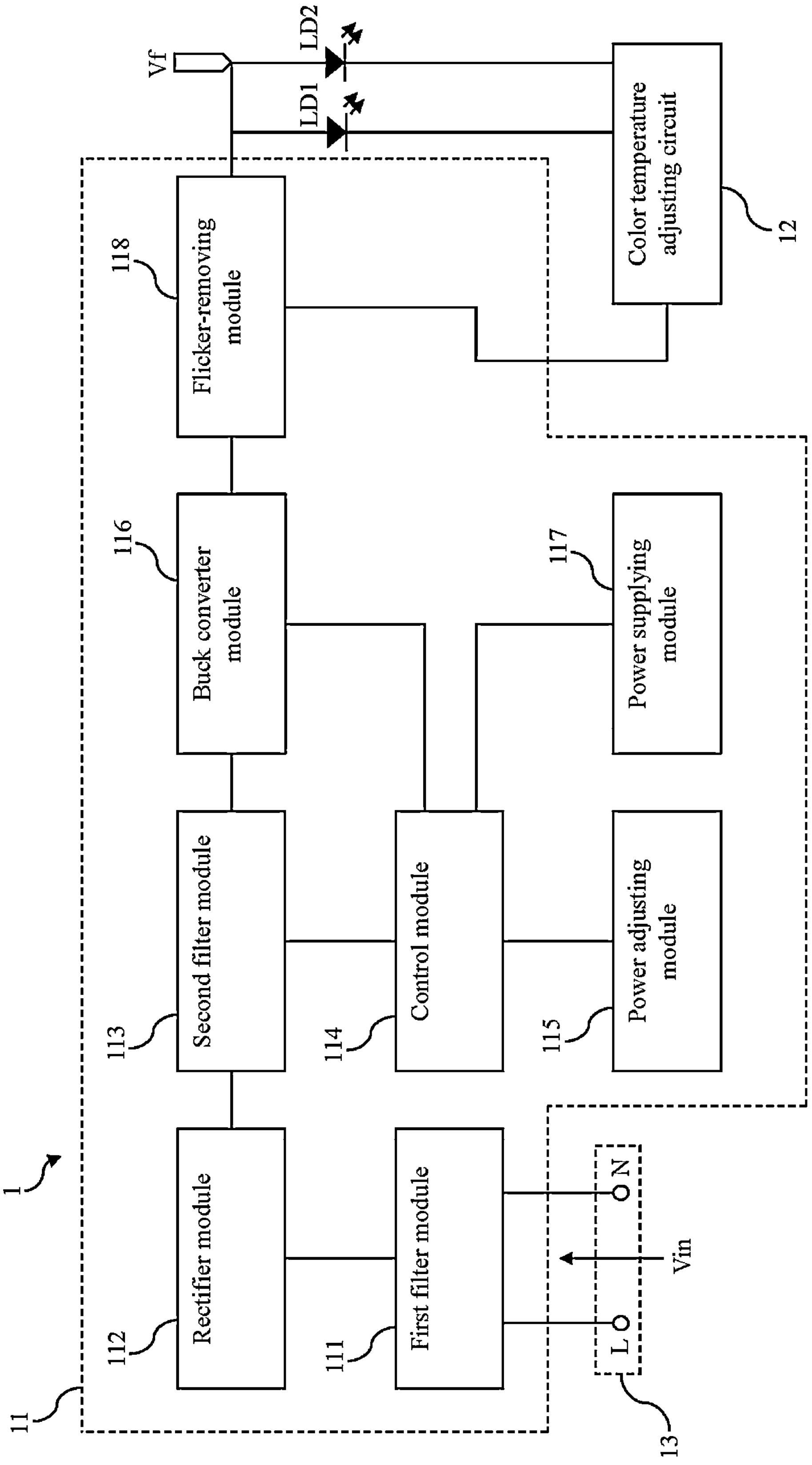
FIG. 1 is a block diagram of a lighting device having color temperature adjusting function in accordance with one embodiment of the present invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing. It should be understood that, when it is described that an element is "coupled" or "connected" to another element, the element may be "directly coupled" or "directly connected" to the other element or "coupled" or "connected" to the other element through a third element. In contrast, it should be understood that, when it is described that an element is "directly coupled" or "directly connected" to another element, there are no intervening elements.

Please refer to FIG. 1, which is a block diagram of a lighting device having color temperature adjusting function in accordance with one embodiment of the present invention. As shown in FIG. 1, the lighting device control circuit 1 includes an input voltage generating circuit 11, a color temperature adjusting circuit 12 and an input connector 13. The lighting device control circuit 1 is applicable to a lighting device (e.g., downlight, panel light or other currently available lighting devices).

The input connector 13 has a live wire input terminal L and a neutral wire input terminal N. The input connector 13 is connected to the input voltage generating circuit 11 and connected to an external power source (e.g., utility power) so as to receive an alternating-current (AC) voltage signal Vin.

The input voltage generating circuit 11 can generate an input voltage Vf. The input voltage generating circuit 11 includes a first filter module 111, a rectifier module 112, a second filter module 113, a control module 114, a power adjusting module 115, a buck converter module 116, a power supplying module 117 and an anti-flicker module 118. The first filter module 111 is connected to the rectifier module 112. The rectifier module 112 is connected to the second filter module 113. The second filter module 113 is connected to the buck converter module 116 and the control module 114. The control module 114 is connected to the second filer module 113, the power adjusting module 115, the buck converter module 116 and the power supplying module 117. The buck converter module 116 is connected to the anti-flicker module 118. The anti-flicker module 118 is connected to the color temperature adjusting circuit 12, the positive electrode of a first light source LD1 and the positive electrode of a second light source LD2. The color temperature adjusting circuit 12 is connected to the negative electrode of the first light source LD1 and the negative electrode of the second light source LD2. In this embodiment, the first light source LD1 and the second light source LD2 are light-emitting diodes (LEDs), and the color temperature of the first light source LD1 is lower than that of the second light source LD2. In another embodiment, the color temperature of the first light source LD1 is greater than that of the second light source LD2.

The first filter module 111 may be an electromagnetic interference (EMI) filter, which can filter the voltage signal. The rectifier module 112 may be a bridge filter, which can rectify the output signal of the first filter module 111. The second filter module 112 may be a pi(π)-type filter, which can filter the output signal of the rectifier module 112. The control module 114 may be a main control chip for executing necessary controls. The power adjusting module 115 may be a power adjusting circuit for executing the power adjusting function. The buck converter module 116 may be a buck converter, which can adjust the output signal of the second filter module 114 and receive the control signal of the control module 114. The power supplying module 117 may be a power supplying circuit, which can provide the operating voltage and overvoltage protection function. The anti-flicker module 118 may be an anti-flicker circuit, which can properly process the output signal of the buck converter module 116 in order to achieve the anti-flicker function. Via the above circuit structure, the input voltage generating circuit 11 can generate the input voltage Vf so as to drive the first light source LD1 and second light source LD2. The color temperature adjusting circuit 12 can perform a special color temperature adjusting mechanism to adjust the input voltage Vf with a view to accurately controlling the overall color temperature of the first light source LD1 and second light source LD2.

The embodiment just exemplifies the present invention and is not intended to limit the scope of the present invention; any equivalent modification and variation according to the spirit of the present invention is to be also included within the scope of the following claims and their equivalents.

Figure 2:
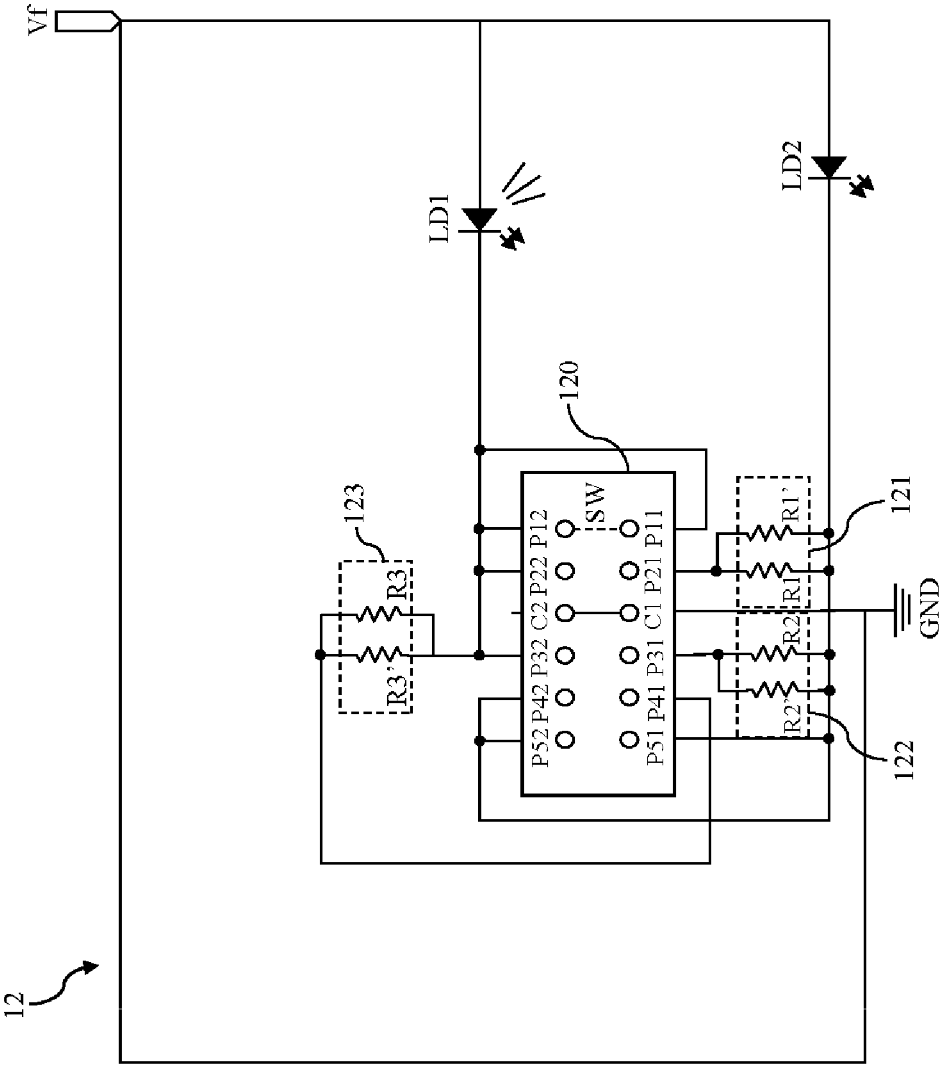
FIG. 2 is a first schematic view of the lighting device having color temperature adjusting function in operation in accordance with one embodiment of the present invention.

Please refer to FIG. 2, which is a first schematic view of the lighting device having color temperature adjusting function in operation in accordance with one embodiment of the present invention. As shown in FIG. 2, the color temperature adjusting circuit 12 includes an encoder switch 120, a first voltage adjusting element 121, a second voltage adjusting element 122 and a third voltage adjusting element 123. In this embodiment, the color temperature of the first light source LD1 is 2700K and the color temperature of the second light source LD2 is 5000K. In another embodiment, the color temperatures of the first light source LD1 and second light source LD2 can be changed according to actual requirements.

The encoder switch 120 includes a first main pin P11, a first auxiliary pin P12, a second main pin P21, a second auxiliary pin P22, a third main pin P31, a third auxiliary pin P32, a fourth main pin P41, a fourth auxiliary pin P42, a fifth main pin P51, a fifth auxiliary pin P52, a main common pin C1, an auxiliary common pin C2 and a switch element SW. The main common pin C1 and the auxiliary common pin C2 are connected to a grounding point GND. The user can selectively connect any one of the main pins to the auxiliary pin corresponding thereto via the switch element SW.

The positive electrode of the first light source LD1 is connected to the grounding point GND and the negative electrode of the first light source LD1 is connected to the first main pin P11, first auxiliary pin P12 and second auxiliary pin P22. The positive electrode of the second light source LD2 is connected to the grounding point GND and the negative electrode of the second light source LD2 is connected to the second main pin P21 via the first voltage adjusting element 121. In this embodiment, the first voltage adjusting element 121 includes two first resistors R1, R1' connected to each other in parallel.

The negative electrode of the first light source LD1 is connected to the third auxiliary pin P32. The negative electrode of the second light source LD2 is connected to the third main pin P31 via the second voltage adjusting element 122. In this embodiment, the second voltage adjusting element 122 includes two second resistors R2, R2' connected to each other in parallel.

Besides, the negative electrode of the first light source LD1 is connected to the fourth main pin P41 via the third voltage adjusting element 123. The negative electrode of the second light source LD2 is connected to the fourth auxiliary pin P42.

In addition, the negative electrode of the second light source LD2 is connected to the fifth main pin P51 and fifth auxiliary pin P52. In this embodiment, the third voltage adjusting element 123 includes two third resistors R3, R3' connected to each other in parallel.

As shown in FIG. 2, when the user controls the switch element SW to connect the first min pin P11 to the first auxiliary pin P12, the color temperature adjusting circuit 12 is in the first gear. In this case, the first main pin P11, first auxiliary pin P12, main common pin C1 and auxiliary common pin C2 are connected to form a loop, which is also connected to the grounding point GND. Therefore, the loop includes only the first light source LD1. Thus, the first light source LD1 is turned on; the overall color temperature of the first light source LD1 and second light source LD2 is 2700K (the overall color temperature is equal to the color temperature of the first light source LD1).

The embodiment just exemplifies the present invention and is not intended to limit the scope of the present invention; any equivalent modification and variation according to the spirit of the present invention is to be also included within the scope of the following claims and their equivalents.

Figure 3:
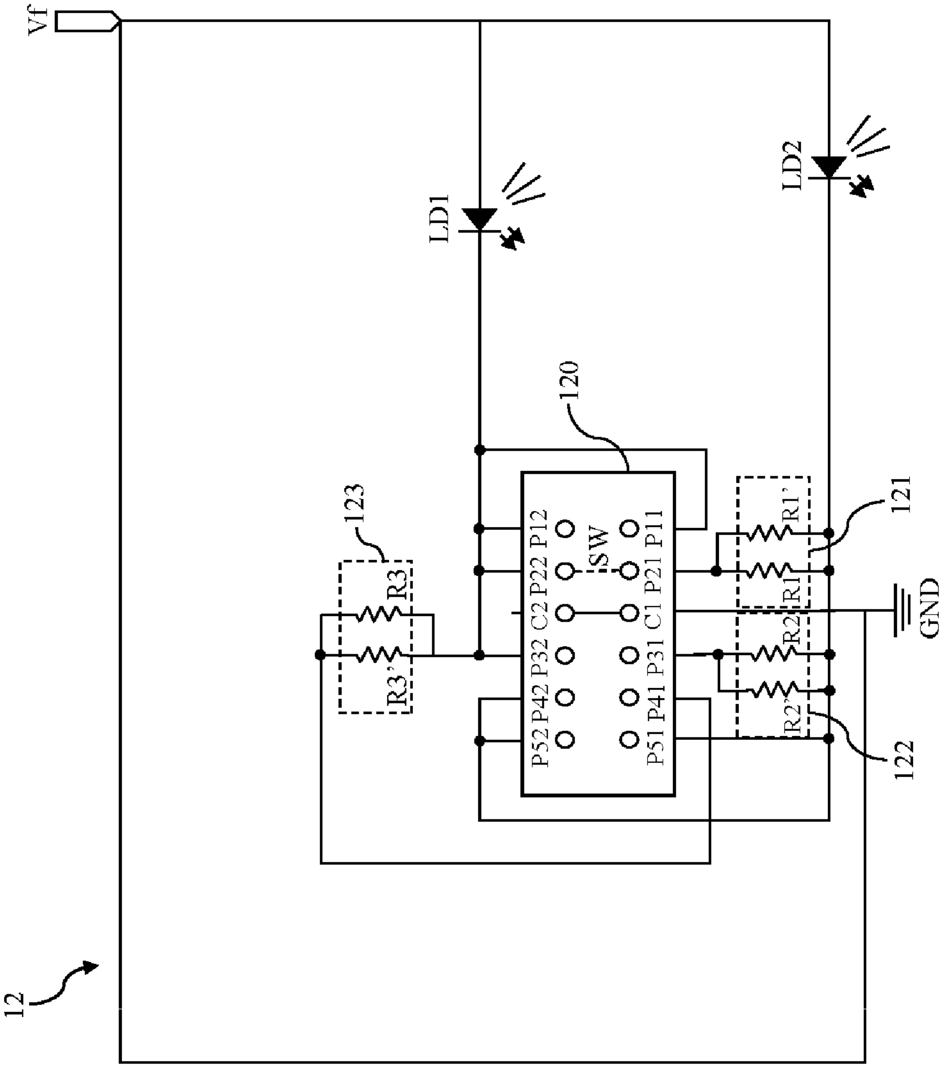
FIG. 3 is a second schematic view of the lighting device having color temperature adjusting function in operation in accordance with one embodiment of the present invention.

Please refer to FIG. 3, which is a second schematic view of the lighting device having color temperature adjusting function in operation in accordance with one embodiment of the present invention. As shown in FIG. 3, when the user controls the switch element SW to connect the second min pin P21 to the second auxiliary pin P22, the color temperature adjusting circuit 12 is in the second gear. In this case, the second main pin P21, second auxiliary pin P22, main common pin C1 and auxiliary common pin C2 are connected to form a loop, which is also connected to the grounding point GND. Therefore, the loop includes the first light source LD1 and second light source LD2. However, the input voltage Vf applied to the second light source LD2 is reduced by the first voltage adjusting element 121, so the current passing through the second light source LD2 is decreased. Therefore, the first light source LD1 and second light source LD2 are turned on; the overall color temperature of the first light source LD1 and second light source LD2 is 3000K.

As set forth above, the lighting device control circuit 1 can integrate the functions of the encoder switch 120 with the voltage-ampere characteristics of light sources (LEDs), so the lighting device control circuit 1 can adjust the input voltage Vf via a specially-designed color temperature adjusting mechanism in order to accurately control the color temperature of the light sources. Accordingly, the lighting device control circuit 1 can effectively simplify the color temperature adjusting mechanism of a lighting device with a view to satisfy actual requirements. As the lighting device control circuit 1 can effectively simplify the color temperature adjusting mechanism, so the cost for realizing the color temperature adjusting function can be reduced. As a result, the lighting device can be more competitive in the market.

The embodiment just exemplifies the present invention and is not intended to limit the scope of the present invention; any equivalent modification and variation according to the spirit of the present invention is to be also included within the scope of the following claims and their equivalents.

It is worthy to point out that the color temperature adjusting function of a currently available lighting device needs to be realized by a complicated circuit. Thus, the operation mechanism thereof is complicated and the cost thereof is also high. On the contrary, according to one embodiment of the present invention, the lighting device control circuit can integrate the functions of an encoder switch with voltage-ampere characteristics of light sources (LEDs), so the lighting device control circuit can adjust the input voltage via a specially-designed color temperature adjusting mechanism in order to accurately control the color temperature of the light sources. Accordingly, the lighting device control circuit can effectively simplify the color temperature adjusting mechanism of a lighting device with a view to satisfy actual requirements.

Also, according to one embodiment of the present invention, the lighting device control circuit can integrate the functions of the encoder switch with voltage-ampere characteristics of the light sources (LEDs) in order to simplify the color temperature adjusting mechanism of the lighting device. Thus, the cost for realizing the color temperature adjusting function of the lighting device can be reduced, so the lighting device can be more competitive in the market.

Further, according to one embodiment of the present invention, the lighting device control circuit is provided with a plurality of voltage adjusting elements, so the lighting device can provide two or more color temperature. As a result, the lighting device can be more convenient and flexible in use.

Moreover, according to one embodiment of the present invention, the lighting device control circuit can be further provided with an anti-flicker module, so the lighting device can have the anti-flicker function and power adjusting function. Therefore, the performance of the lighting device can be further enhanced so as to conform to actual requirements.

Furthermore, according to one embodiment of the present invention, the lighting device control circuit can be further provided with an overvoltage protection function, which can significantly increase the safety of the lighting device. Thus, the lighting device can be more comprehensive in use in order to satisfy the requirements of different applications. Accordingly, the lighting device control circuit having color temperature adjusting function according to the embodiments of the present invention can definitely achieve great technical effects.

Figure 4:
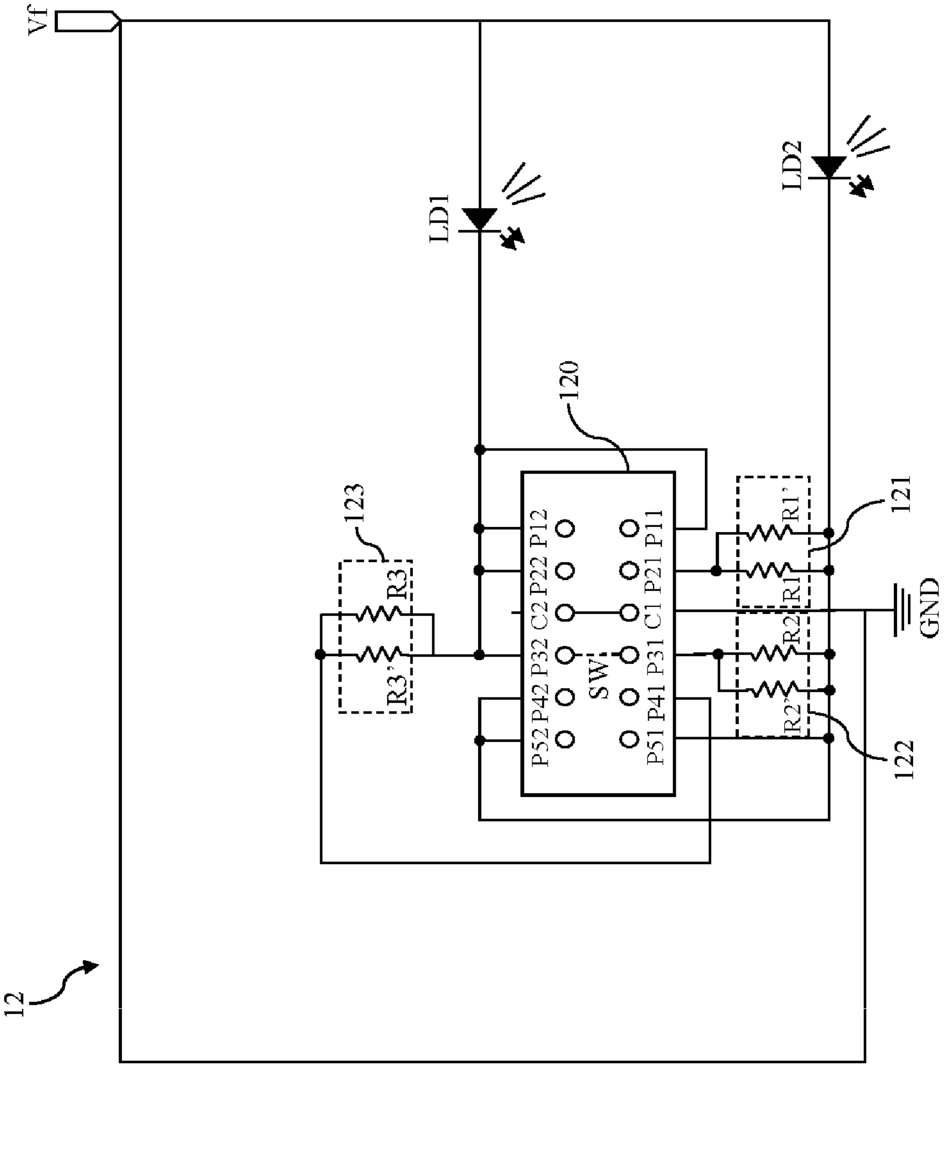
FIG. 4 is a third schematic view of the lighting device having color temperature adjusting function in operation in accordance with one embodiment of the present invention.

Please refer to FIG. 4, which is a third schematic view of the lighting device having color temperature adjusting function in operation in accordance with one embodiment of the present invention. The lighting device control circuit 1 can further provide more color temperature gears. As shown in FIG. 4, when the user controls the switch element SW to connect the third min pin P31 to the third auxiliary pin P32, the color temperature adjusting circuit 12 is in the third gear. In this case, the third main pin P31, third auxiliary pin P32, main common pin C1 and auxiliary common pin C2 are connected to form a loop, which is also connected to the grounding point GND. Therefore, the loop includes the first light source LD1 and second light source LD2. However, the input voltage Vf applied to the second light source LD2 is reduced by the second voltage adjusting element 122 (the resistance of the second voltage adjusting element 122 is lower than that of the first voltage adjusting element 121), so the current passing through the second light source LD2 is decreased. Therefore, the first light source LD1 and second light source LD2 are turned on; the overall color temperature of the first light source LD1 and second light source LD2 is 3500K.

The embodiment just exemplifies the present invention and is not intended to limit the scope of the present invention; any equivalent modification and variation according to the spirit of the present invention is to be also included within the scope of the following claims and their equivalents.

Figure 5:
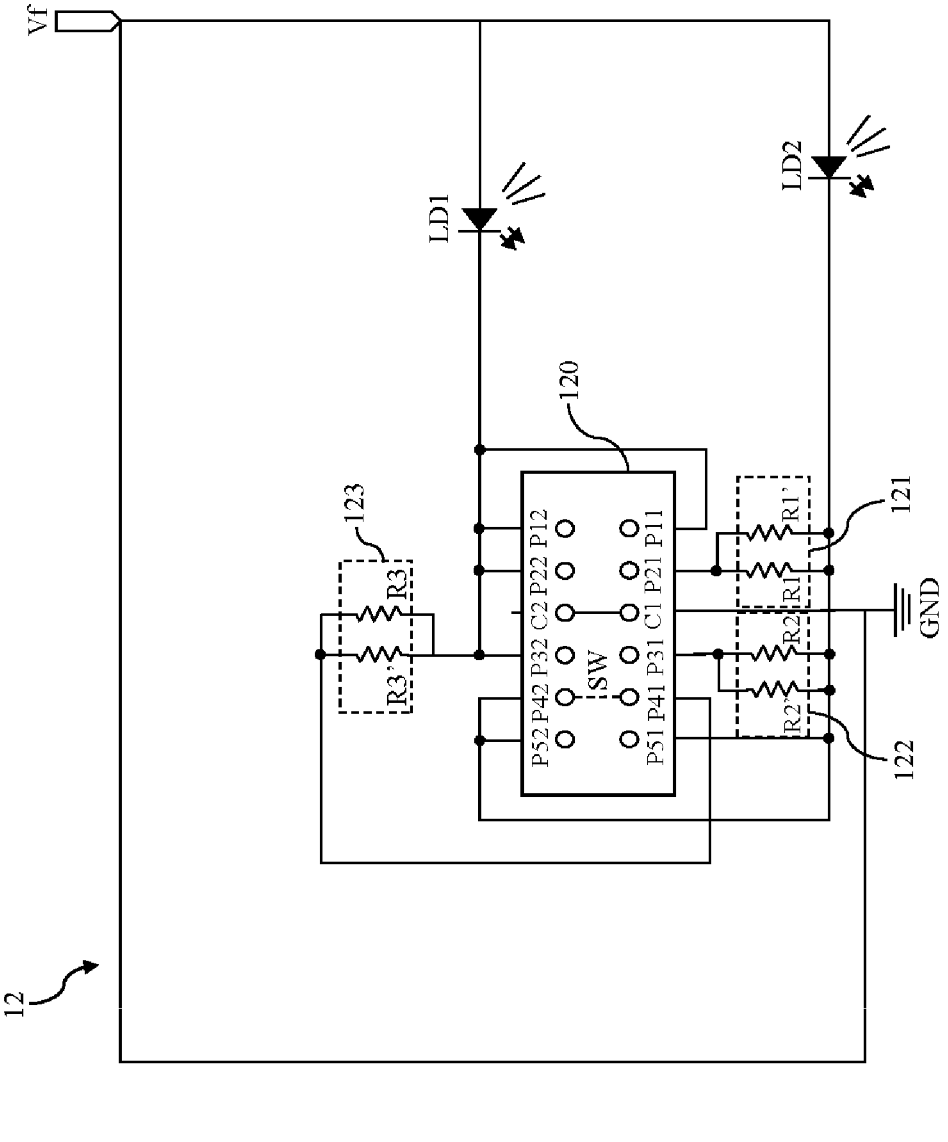
FIG. 5 is a fourth schematic view of the lighting device having color temperature adjusting function in operation in accordance with one embodiment of the present invention.

Please refer to FIG. 5, which is a fourth schematic view of the lighting device having color temperature adjusting function in operation in accordance with one embodiment of the present invention. As shown in FIG. 5, when the user controls the switch element SW to connect the fourth min pin P41 to the fourth auxiliary pin P42, the color temperature adjusting circuit 12 is in the fourth gear. In this case, the fourth main pin P41, fourth auxiliary pin P42, main common pin C1 and auxiliary common pin C2 are connected to form a loop, which is also connected to the grounding point GND. Therefore, the loop includes the first light source LD1 and second light source LD2. However, the input voltage Vf applied to the first light source LD1 is reduced by the third voltage adjusting element 123, so the current passing through the first light source LD1 is decreased. Therefore, the first light source LD1 and second light source LD2 are turned on; the overall color temperature of the first light source LD1 and second light source LD2 is 4000K.

The embodiment just exemplifies the present invention and is not intended to limit the scope of the present invention; any equivalent modification and variation according to the spirit of the present invention is to be also included within the scope of the following claims and their equivalents.

Figure 6:
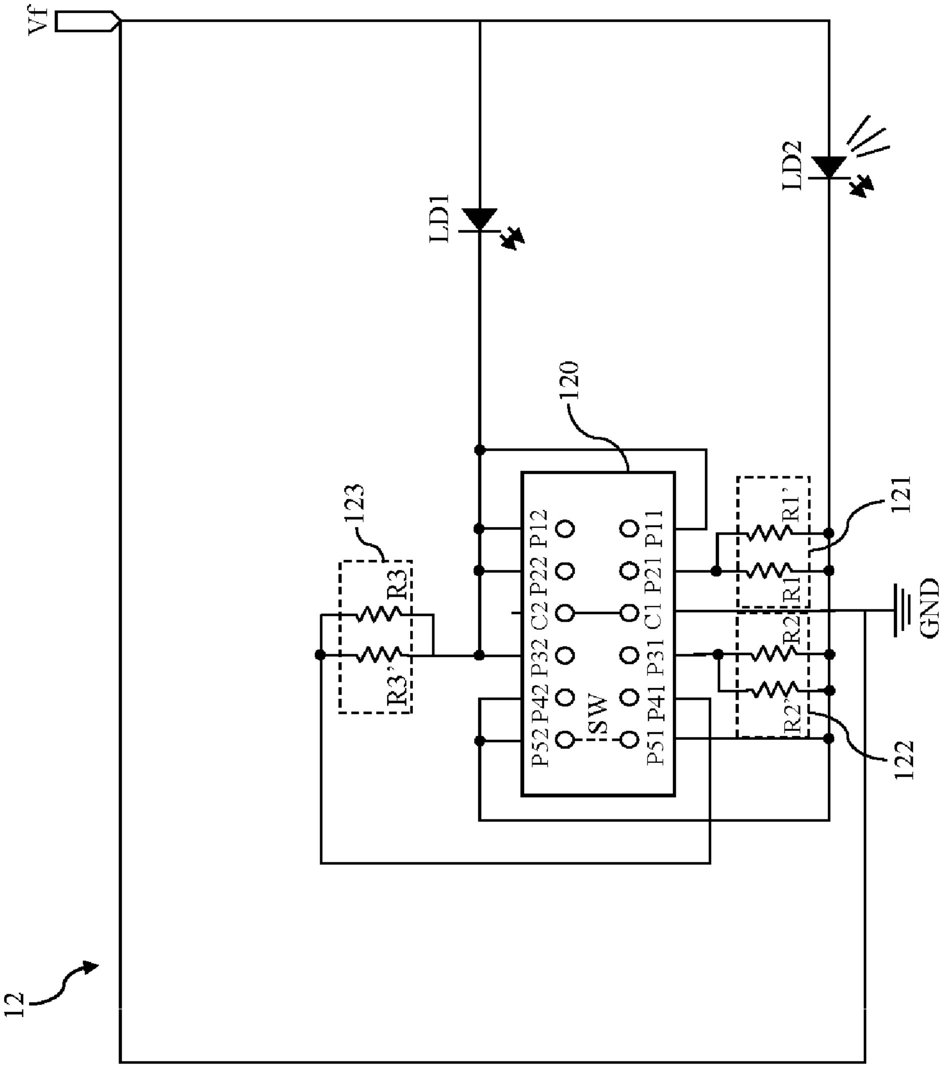
FIG. 6 is a fifth schematic view of the lighting device having color temperature adjusting function in operation in accordance with one embodiment of the present invention.

Please refer to FIG. 6, which is a fifth schematic view of the lighting device having color temperature adjusting function in operation in accordance with one embodiment of the present invention. As shown in FIG. 6, when the user controls the switch element SW to connect the fifth min pin P51 to the fifth auxiliary pin P52, the color temperature adjusting circuit 12 is in the fifth gear. In this case, the fifth main pin P51, fifth auxiliary pin P52, main common pin C1 and auxiliary common pin C2 are connected to form a loop, which is also connected to the grounding point GND. Therefore, the loop includes only the second light source LD2. Therefore, the second light source LD2 is turned on; the overall color temperature of the first light source LD1 and second light source LD2 is 5000K (the overall color temperature is equal to the color temperature of the second light source LD2).

As described above, the lighting device control circuit 1 has several voltage adjusting elements, so the lighting device having the lighting device control circuit 1 can provide two or more color temperatures (e.g., 2700K, 3000K, 3500K, 4000K, 5000K . . . ). Accordingly, the lighting device can be more convenient and flexible in use so as to meet the requirements of different applications.

The embodiment just exemplifies the present invention and is not intended to limit the scope of the present invention; any equivalent modification and variation according to the spirit of the present invention is to be also included within the scope of the following claims and their equivalents.

To sum up, according to one embodiment of the present invention, the lighting device control circuit can integrate the functions of an encoder switch with voltage-ampere characteristics of light sources (LEDs), so the lighting device control circuit can adjust the input voltage via a specially-designed color temperature adjusting mechanism in order to accurately control the color temperature of the light sources. Accordingly, the lighting device control circuit can effectively simplify the color temperature adjusting mechanism of a lighting device with a view to satisfy actual requirements.

Also, according to one embodiment of the present invention, the lighting device control circuit can integrate the functions of the encoder switch with voltage-ampere characteristics of the light sources (LEDs) in order to simplify the color temperature adjusting mechanism of the lighting device. Thus, the cost for realizing the color temperature adjusting function of the lighting device can be reduced, so the lighting device can be more competitive in the market.

Further, according to one embodiment of the present invention, the lighting device control circuit is provided with a plurality of voltage adjusting elements, so the lighting device can provide two or more color temperature. As a result, the lighting device can be more convenient and flexible in use.

Moreover, according to one embodiment of the present invention, the lighting device control circuit can be further provided with an anti-flicker module, so the lighting device can have the anti-flicker function and power adjusting function. Therefore, the performance of the lighting device can be further enhanced so as to conform to actual requirements.

Furthermore, according to one embodiment of the present invention, the lighting device control circuit can be further provided with an overvoltage protection function, which can significantly increase the safety of the lighting device. Thus, the lighting device can be more comprehensive in use in order to satisfy the requirements of different applications.

Those skilled in the art will readily observe that numerous modifications and alterations of the device and method may be made while retaining the teachings of the invention.

Accordingly, the above disclosure should be construed as limited only by the metes and bounds of the appended claims.

What is claimed is:

1. A lighting device control circuit having color temperature adjusting function, comprising an input voltage generating circuit, a color temperature adjusting circuit and an input connector:

the input voltage generating circuit configured to generate an input voltage; the color temperature adjusting circuit performs a color temperature adjusting mechanism to adjust the input voltage with a view to accurately controlling an overall color temperature of a first light source and a second light source; and the input connector is connected to the input voltage generating circuit and connected to an external power source for receiving an alternating-current voltage signal; and wherein the color temperature adjusting circuit comprises an encoder switch and a first voltage adjusting element, wherein the encoder switch comprises a first main pin, a first auxiliary pin, a second main pin, a second auxiliary pin, a main common pin, an auxiliary common pin and a switch element, wherein the main common pin and the auxiliary common pin are connected to a grounding point, and the switch element is configured to selectively connect the first main pin to the first auxiliary pin or connect the second main pin to the second auxiliary pin;

wherein a positive electrode of the first light source is connected to the grounding point, a negative electrode of the first light source is connected to the first main pin, the first auxiliary pin and the second auxiliary pin, wherein a positive electrode of the second light source is connected to the grounding point, a negative electrode of the second light source is connected to the second main pin via the first voltage adjusting element.

2. The lighting device control circuit having color temperature adjusting function as claimed in claim 1, wherein the first voltage adjusting element comprises two first resistors connected to each other in parallel.

3. The lighting device control circuit having color temperature adjusting function as claimed in claim 1, wherein the color temperature adjusting circuit further comprises a second voltage adjusting element, and the encoder switch further comprises a third main pin and a third auxiliary pin, wherein the negative electrode of the first light source is connected to the third auxiliary pin, the negative electrode of the second light source is connected to the third main pin via the second voltage adjusting element, and the switch element is configured to selectively connect the third main pin to the third auxiliary pin.

4. The lighting device control circuit having color temperature adjusting function as claimed in claim 3, wherein the second voltage adjusting element comprises two second resistors connected to each other in parallel.

5. The lighting device control circuit having color temperature adjusting function as claimed in claim 3, wherein the color temperature adjusting circuit further comprises a third voltage adjusting element, and the encoder switch further comprises a fourth main pin and a fourth auxiliary pin, wherein the negative electrode of the first light source is connected to the fourth main pin via the third voltage adjusting element, the negative electrode of the second light source is connected to the fourth auxiliary pin, and the switch element is configured to selectively connect the fourth min pin to the fourth auxiliary pin.

6. The lighting device control circuit having color temperature adjusting function as claimed in claim 5, wherein the third voltage adjusting element comprises two third resistors connected to each other in parallel.

7. The lighting device control circuit having color temperature adjusting function as claimed in claim 5, wherein the encoder switch further comprises a fifth main pin and a fifth auxiliary pin, wherein the negative electrode of the second light source is connected to the fifth main pin and the fifth auxiliary pin, and the switch element is configured to selectively connect the fifth min pin to the fifth auxiliary pin.

8. The lighting device control circuit having color temperature adjusting function as claimed in claim 1, wherein a color temperature of the first light source is different from a color temperature of the second light source.

9. The lighting device control circuit having color temperature adjusting function as claimed in claim 1, wherein a color temperature of the first light source is lower than a color temperature of the second light source.

10. The lighting device control circuit having color temperature adjusting function as claimed in claim 1, wherein the first light source and the second light source are light-emitting diodes.

* * * * *